July 5, 1960   M. W. BARRETT   2,943,681
FRACTURING USING CALCIUM CARBIDE
Filed April 29, 1957
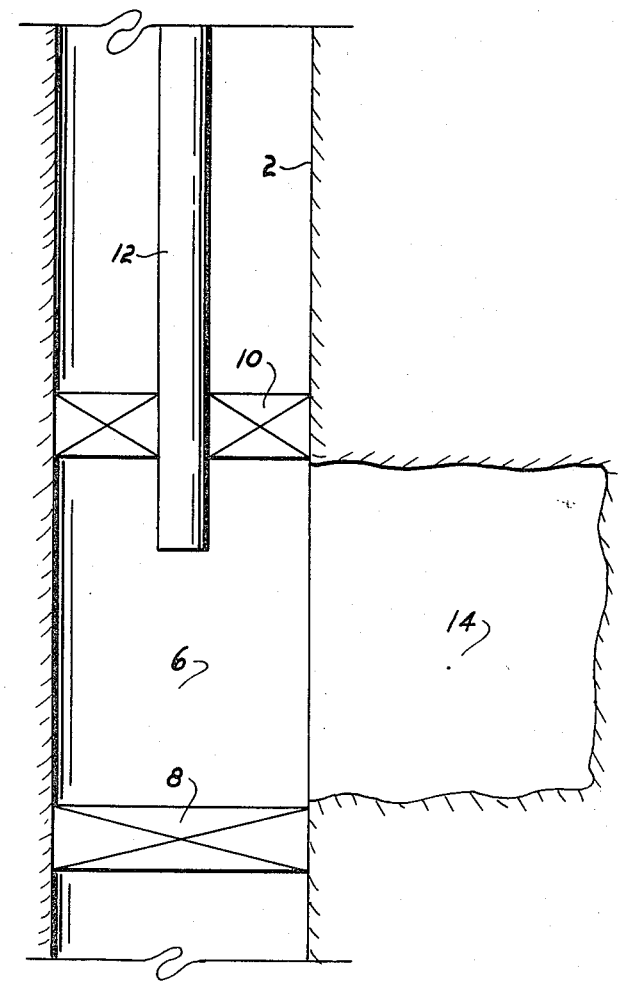
INVENTOR.
Michael W. Barrett
BY
ATTORNEY

United States Patent Office 2,943,681
Patented July 5, 1960

2,943,681

FRACTURING USING CALCIUM CARBIDE

Michael W. Barrett, 544 W. College, Seminole, Okla.

Filed Apr. 29, 1957, Ser. No. 655,629

4 Claims. (Cl. 166—38)

This invention relates generally to improvements in methods of fracturing oil and gas wells, and more particularly to an improved method of fracturing utilizing calcium carbide.

In the usual method of fracturing a well, the zone of the well bore to be fractured is packed off in any suitable manner and a fracturing fluid is injected into the isolated zone. The pressure of the fracturing fluid is increased, usually by the injection of additional quantities of the fracturing fluid, until the strata surrounding the isolated zone is ruptured or fractured. Upon fracturing, sand is usually pumped into the fractures for maintaining the fractures open when the pressure in the well bore is subsequently decreased. When using this method, the energy available for fracturing is derived solely from mechanical apparatus located at the surface of the well, and a pressure substantially equal to the pressure developed in the zone to be fractured is also imposed on the tubing used for injecting the fracturing fluid. As a result, the force which may be developed in the desired zone has a very definite limitation, thereby limiting the extent to which the well may be fractured.

The present invention contemplates either the use of a chemical reaction for replacing the above-mentioned mechanical energy requirements, or, preferably, the use of a chemical reaction in combination with the energy derived by mechanical means. In its broader aspects, the present invention may be described as use of the time-honored reaction of calcium carbide and water, as in creating acetylene gas for acetylene welding, to create pressure in an isolated zone of a well bore, or in fractures surrounding an isolated zone of a well bore. The calcium carbide is injected into the desired position in a non-reactive carrier, and then water is injected into the desired location to react with the carbide and create the desired pressure.

An important object of this invention is to increase the size of fractures around a well without increasing the horsepower requirements of apparatus used in initially fracturing the well.

Another object of this invention is to utilize a chemical reaction for creating fracturing energy at the point where the energy is utilized.

A further object of this invention is to use calcium carbide in a fracturing operation. In addition, an objective of this invention is to inject the calcium carbide in an initially non-reactive carrier which will present the least interference to the reaction of water with the carbide when such reaction is desired.

A still further object of this invention is to provide a novel method of fracturing wells utilizing standard apparatus and economical materials which are readily available.

Other objects and advantages of the invention will be evident from the following detailed description, when read in conjunction with the accompanying drawing which illustrates my invention.

The single figure in the drawing is a schematic vertical sectional view through a portion of a well bore being fractured in accordance with the present invention.

Referring to the drawing in detail, reference character 2 designates a well bore extending from the surface of the earth downwardly through at least one potentially productive strata 4. The well bore 2 may be open, as shown, or suitably cased, not shown, as is well known in the art. In the event the well bore 2 is cased, the casing will be perforated in the zone 6 where it is desired that the well be fractured. The zone 6 is straddled and isolated by a lower packer 8 and an upper packer 10. The upper packer 10 receives a tubing 12 extending down into the zone 6 from the surface. The upper end of the tubing 12 communicates with suitable pumps and a fluid supply in a manner common to the art.

As previously indicated, the reaction of calcium carbide and water may be used either in lieu of or in combination with fracturing energy derived by mechanical means. I prefer that the well 2 first be fractured by the use of mechanical energy to provide at least one fracture 14 in the strata 4 opposite the isolated zone 6 of the well. The fracture 14 is created by the continued injection of a fracturing fluid from the surface down through the tubing 12 into the zone 6. The fracturing fluid is, of course, injected with substantial pressure and such injection is continued until the strata 4 is ruptured; resulting in a fracture such as at 14. Such an operation may employ any desired fracturing fluid, including fluids using one of the commonly known fluid loss control additives. Also, the resulting fracture 14 may be either vertical or horizontal. I prefer that sand not be injected into the fracture 14.

After creation of the fracture 14, at least a portion of the fracturing fluid occupying the zone 6 and the fracture 14 must be displaced. If the fracturing fluid had an extremely low fluid loss, thereby preventing further injection of the fracturing fluid into the strata 4, the pressure of the fluid may be reduced to hydrostatic, and the well 2 swabbed in a conventional manner. However, I prefer to force at least a portion of the fracturing fluid on into the strata 4, as will be described, thereby reducing the time required in practicing the present method, as well as maintaining equipment and operating costs at a minimum.

A quantity of calcium carbide mixed in a suitable liquid carrier which is non-reactive with the carbide is next pumped down the tubing 12 into the zone 6 and the fracture 14. If the zone 6 and fracture 14 are filled with the usual fracturing fluid upon injection of the calcium carbide mixture, the mixture may be injected at sufficient pressure to force either the fracturing fluid or a portion of the carrier into the strata 4. The calcium carbide may be of any particle size, but I prefer to use a range of particle sizes varying from about the size of a sand grain up to particles about the size of a pea. This particle size range facilitates the distribution of the carbide in the zone 6 and throughout the length of the fracture 14, measured radially from the well 2. The fracture 14 will ordinarily be wider adjacent the well 2 and decrease in width toward its outer end. The smaller carbide particles will be carried to the outer extremities of the fracture 14, and the larger particles will be progressively trapped back through the fracture 14, with a portion of the carbide particles being left in the zone 6.

The carbide mixture is immediately followed by a few barrels of oil containing no water to provide a buffer zone between the mixture and subsequently injected water, whereby the desired reaction will not occur until the carbide is in the desired location. As indicated, water is injected down through the tubing 12 into the zone 6 and the fracture 14 immediately following the buffer. If the zone 6 and fracture 14 are completely filled with the carbide and its carrier, the injected water will displace an equal volume of the carrier into the strata 4. As soon as the injected water contacts the calcium carbide, gas will be evolved and the pressure of the fluids in the zone 6 and the fracture 14 will be appreciably increased. Upon injection of the water, the tubing 12 is closed off in any desired manner, or a pressure is maintained on the upper end of the tubing 12, to prevent the escape of fluids upwardly through the well 2 during the reaction of the water with the carbide. The resulting increased pressure in the zone 6, and particularly in the fracture 14, will provide either an extension of the fracture 14 or an additional fracture around the zone 6, or both such results. The increased pressure will act in the same manner as the increased internal pressure developed by the fracturing fluid and mechanical pumping means.

Upon a subsequent decrease of pressure in the zone 6 and fracture 14, the well 2 may be swabbed and completed in the usual manner to provide a production of formation fluids through the fracture 14, the zone 6 and the well 2.

The total and relative quantities of calcium carbide and water used in any particular well will be based upon the pressure desired. However, I prefer to use an excess of water over the calculated amount required to normally react with all of the injected calcium carbide, to assure that all of the calcium carbide is put to use.

Substantially any liquid hydrocarbon, such as oil, gasoline or kerosene, will provide a suitable carrier for the purpose of transporting the calcium carbide into the desired location and will be non-reactive with the carbide, yet will permit a reaction of water with the carbide when the water is subsequently injected into the carbide and liquid hydrocarbon mixture.

To illustrate the results obtained by use of such carriers, I placed a mixture comprising one cup of a commercial lubricating oil and one half a cup of carbide in a pressure-tight container of about one and a half gallons capacity. Upon the injection of one cup of water into the container, the pressure in the container increased immediately and reached 40 p.s.i.g. in three minutes. Gasoline used as the carrier provides similar results. The carbide will not remain in suspension in the lubricating oil or gasoline, but this is no objection to injection of the carbide through a tubing 12 into the zone 6 and fracture 14, as will be apparent to those skilled in the art, since sand is now easily injected in an oil carrier.

Although any available liquid hydrocarbon may be used as a carrier for the carbide, I prefer to use kerosene as the carrier, since kerosene presents a highly reduced interference to, and appears to facilitate, the reaction of water with the carbide. To illustrate, I placed a mixture of one cup of kerosene and one half cup of carbide in the pressure-tight container mentioned above. Upon injection of one cup of water, the pressure in the container reached 200 p.s.i.g. in 58 seconds. The pressure of the container was then bled off and another cup of water injected. The pressure of the container subsequently increased to 96 p.s.i.g. in 2 minutes. It will thus be seen that when kerosene is used as a carrier, the resulting pressure, upon water injection, is increased at a much faster rate and reaches a higher total pressure. Both the time factor and the total pressure factor are important in reducing the time required in practicing the method and in providing the maximum extension of the fracture 14.

Calcium carbide may also be mixed at the surface and injected with the fracturing fluid to create the fracture 14. In one embodiment, the carbide is injected with the fracturing fluid and the pressure of the fracturing fluid is increased in the manner described above until the fracture 14 is created. A quantity of water may then be injected down through the tubing 12 to contact the carbide distributed through the zone 6 and the fracture 14 to again increase the pressure in the zone 6 and fracture 14 and provide an extension of the fracture, or the creation of additional fractures. When the carbide is injected with the fracturing fluid, it will be distributed through the zone 6 and fracture 14 in the same manner as previously described. Also, it may be noted that the usual fracturing fluid is an oil composition, whereby the carbide will not be reacted until water is purposely injected through the tubing 12. The usual fluid loss additive in the fracturing fluid will not interfere with the subsequent reaction of water with the carbide.

In still another embodiment of the present invention the carbide is injected with the fracturing fluid into the zone 6. However, instead of increasing the pressure of the fracturing fluid in the zone 6 by a continued injection of fracturing fluid through the tubing 12, a suitable quantity of water may be injected immediately following the fracturing fluid to react with the carbide only in the zone 6. The resulting reaction will provide a substantial increase in the pressure of the fracturing fluid in the zone 6 to create the fracture 14 in much the same manner as if the pressure of the fracturing fluid were increased by mechanical means in the conventional manner. The tubing 12 will, of course, be closed off or maintained under pressure after injection of the water to prevent an escape of fluid up through the well 2 during the reaction of the water and carbide.

From the foregoing, it will be apparent that the present invention provides a method of increasing the fractures surrounding a well bore, or the creation of such fractures, without the use of high horsepower requirements in the usual surface equipment utilized in fracturing operations. The present method relies upon a chemical reaction to provide fracturing energy at the point where the energy is utilized. The method may be economically practiced, since standard equipment and readily available, economical materials are used in the method.

Changes may be made in the combination and arrangement of steps or procedure and in the quantities of materials described without departing from the spirit and scope of the invention as defined in the following claims.

I claim:

1. In a method of fracturing a well, the steps of:
    (a) Setting packers above and below the zone of the well to be fractured,
    (b) Extending a tubing from the top of the well downwardly through the upper packer into said zone,
    (c) Pumping calcium carbide in a liquid hydrocarbon carrier through said tubing into said zone,
    (d) Pumping water through said tubing into said zone to react with the calcium carbide, said calcium carbide and water being sufficient in amounts to generate a force in the carrier of a magnitude to fracture the strata around said zone, and
    (e) Closing off said tubing against the escape of fluids upwardly through the well during said reaction.

2. The method of claim 1 characterized further in that said carrier is kerosene.

3. In a method of fracturing a well, the steps of:
    (a) Setting packers above and below the zone of the well to be fractured,
    (b) Extending a tubing from the top of the well downwardly through the upper packer into said zone,
    (c) Pumping a fracturing fluid through said tubing into said zone,
    (d) Increasing the pressure of said fracturing fluid to fracture the strata around said zone,
    (e) Pumping calcium carbide in a liquid hydrocarbon carrier through said tubing into said zone,
    (f) Pumping water through said tubing into said zone to react with the calcium carbide, said calcium carbide and water being sufficient in amounts to generate a force in the carrier and fracturing fluid of a magnitude to further fracture the strata around said zone, and
    (g) Closing off said tubing during said reaction.

4. In a method of fracturing a well, the steps of:

(a) Setting packers above and below the zone of the well to be fractured, (b) Extending a tubing from the top of the well downwardly through the upper packer into said zone, (c) Pumping a fracturing fluid and calcium carbide through said tubing into said zone, (d) Increasing the pressure of said fracturing fluid until a fracture occurs in the strata surrounding said zone, then (e) Pumping water through said tubing into said zone to react with the calcium carbide, said calcium carbide and water being sufficient in amounts to generate a force in the fracturing fluid of a magnitude to further fracture the strata around said zone, and (f) Closing off said tubing to prevent the escape of fluid up the well during said reaction.

References Cited in the file of this patent

UNITED STATES PATENTS

| | | |
|---|---|---|
| 1,856,912 | Grebe et al. | May 3, 1932 |
| 2,712,355 | Hoff | July 5, 1955 |
| 2,748,867 | Lissant | June 5, 1956 |
| 2,766,828 | Rachford | Oct. 16, 1956 |
| 2,799,342 | Fatt | July 16, 1957 |
| 2,811,209 | Elkins | Oct. 29, 1957 |